(12) United States Patent
Gass

(10) Patent No.: US 7,856,229 B2
(45) Date of Patent: Dec. 21, 2010

(54) SYSTEM FOR PERSONAL MANAGEMENT INFORMATION APPLICATIONS

(75) Inventor: Raymond Gass, Bolsenheim (FR)

(73) Assignee: Alcatel, Paris (FR)

( * ) Notice: Subject to any disclaimer, the term of this patent is extended or adjusted under 35 U.S.C. 154(b) by 999 days.

(21) Appl. No.: 11/282,822

(22) Filed: Nov. 21, 2005

(65) Prior Publication Data

US 2006/0121892 A1 Jun. 8, 2006

(30) Foreign Application Priority Data

Dec. 6, 2004 (EP) .................................. 04028844
Dec. 6, 2004 (EP) .................................. 04292878

(51) Int. Cl.
*H04W 74/00* (2009.01)
*H04M 3/00* (2006.01)

(52) U.S. Cl. ...................... 455/418; 455/557; 455/558; 455/556.2; 455/552.1

(58) Field of Classification Search ................. 455/558, 455/557, 556.2, 552.1
See application file for complete search history.

(56) References Cited

U.S. PATENT DOCUMENTS

| | | | | |
|---|---|---|---|---|
| 5,235,633 A * | 8/1993 | Dennison et al. | ......... | 455/456.3 |
| 6,477,247 B1 | 11/2002 | Burg et al. | | |
| 6,760,728 B1 | 7/2004 | Osborn | | |
| 7,249,182 B1 * | 7/2007 | Heinonen et al. | ........... | 709/227 |
| 2002/0069224 A1 | 6/2002 | Asai et al. | | |
| 2005/0047570 A1 * | 3/2005 | Schmid et al. | .............. | 379/189 |
| 2007/0150608 A1 * | 6/2007 | Randall et al. | .............. | 709/228 |

FOREIGN PATENT DOCUMENTS

| | | |
|---|---|---|
| EP | 1 280 075 A | 1/2003 |
| WO | WO 98/56159 A1 | 12/1998 |

OTHER PUBLICATIONS

R. Iannella: "Representing vCard Objects in RDF/XML" Online! Feb. 22, 2001, XP002322423.
ITCWEB@VIRGINIA.EDU: "Ready, Set, Connect at U.Va: How to Use Your ROLM Telephone, Use the PhoneMail System, and Connect Your TV to the U.Va. Cable System-2000-2001 Edition." Internet Document, Online! Sep. 18, 2000, XP002327676.

(Continued)

*Primary Examiner*—Vincent P Harper
*Assistant Examiner*—Mahendra Patel
(74) *Attorney, Agent, or Firm*—Sughrue Mion, PLLC

(57) ABSTRACT

The present invention relates to a system comprising a processor, a memory unit and a display screen, wherein said memory contains instructions that when executed implement a method of importing selected information into a first application, comprising the step of capturing within a displayed screen of a second application a first format of information that includes a plurality of selectable information value types, whereby at least two out of the plurality of information value types have a different value type attribute, whereby each value type attribute is correlated with a local position of the system. The invention relates further to a process for establishing a connection between a portable computer system comprising a processor, a memory unit and a display screen and a plurality of subgroups consisting of interconnected computer systems comprising the steps, wherein said memory contains instructions that when executed implement a method of importing selected information into a first application.

10 Claims, 1 Drawing Sheet

OTHER PUBLICATIONS

Schulzrinne H: "The tel URI for Telephon Numbers-draft-ietf-iptel-rfc2806bis-09"Network Working Group-Internet-Draft, Online! Jun. 26, 2004, XP002327678.

Richard Banks & Alfaholics Ltd: "Alfaholics-Contact US." Internet Document, Online! Dec. 15, 2003, XP002327677.

* cited by examiner

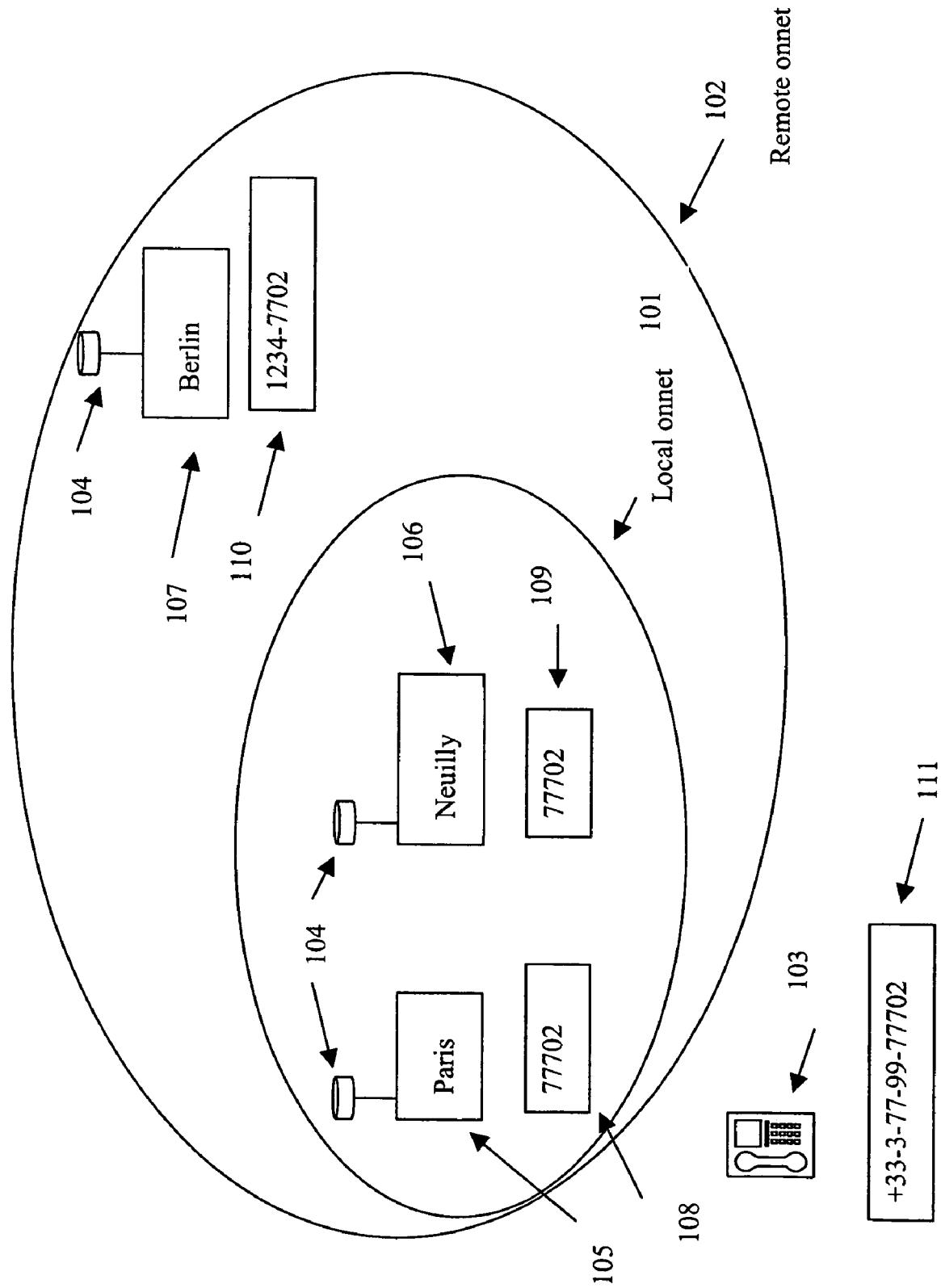

SYSTEM FOR PERSONAL MANAGEMENT INFORMATION APPLICATIONS

The present invention relates to the field of importing and exporting directory information to and from personal information management computer applications. The invention is based on the priority applications EP 04 292 878.8 and EP 04 028 844.1 which are hereby incorporated by reference.

BACKGROUND OF THE INVENTION

The efficient exchange of personal information found in various electronic media into and out of personal information management (hereinafter referred to as "PIM") applications in computer systems including cellular (mobile) phones, personal digital assistants ("PDA") and portable "laptops" has been a challenge. Personal information including directory information, such as phone numbers, e-mail addresses etc can be found in text form in various electronic media.

The functionality of the exchange by using a computer system or other type of electronic system or device is furthermore dramatically enhanced by coupling stand alone devices (including mobile phones) together to form a networking environment. Within such a networking environment, users may readily exchange files, share information stored on a common database etc. and communicate and establish connections via electronic mail (e-mail), voice over internet, voice over phone, via video teleconferencing etc.

Automatic transfer of directory and calendar information is found in various electronic media such as e-mail, SMS. A widely used format is the so-called vcard format which is structured according to the vCard MIME Directory profile type.

Personal Data Interchange (PDI) occurs every time two or more individuals communicate, in either a business or personal context, face-to-face, or across space and time. Such interchanges frequently include the exchange of informal information, such as business cards, telephone numbers, addresses, dates and times of appointments, etc. Augmenting PDI with electronics and telecommunications can help ensure that information is quickly and reliably communicated, stored, organized and easily located when needed.

Personal information, by nature, is complex and diverse. Currently, proprietary standards exist to structure some types of PDI information, but no single, open specification comprehensively addresses the needs of collecting and communicating PDI information across many common communication channels such as telephones, voice-mail, e-mail, and face-to-face meetings.

The hitherto established vcard MIME Directory Profile Type contains directory information, typically pertaining to a single directory entry. The information is described using an attribute schema that is tailored for capturing personal contact information. The vCard can include attributes that describe identification, delivery addressing, telecommunications addressing, geographical, organizational, general explanatory and security and access information about the particular object associated with the vCard.

These types are used in the vCard profile to capture information associated with the identification and naming of the person or resource associated with the vCard.

The Type name "TEL" specifies the telephone number for telephony communication with the object the vCard represents usually with a Type encoding of 8 bits. The Type value is a single phone-number value which is according to the IETF standard specified in a canonical form in order to specify an unambiguous representation of the globally unique telephone endpoint. This type is based on the X.500 Telephone Number attribute. Further specifications in canonical form include but are not restricted to the type parameter "TYPE" to specify intended use for the telephone number. The TYPE parameter values can further include parameters like "home" to indicate a telephone number associated with a residence, "msg" to indicate the telephone number has voice messaging support, "work" to indicate a telephone number associated with a place of work, "pref" to indicate a preferred-use telephone number, "voice" to indicate a voice telephone number, "fax" to indicate a facsimile telephone number, "cell" to indicate a cellular telephone number, "video" to indicate a video conferencing telephone number, "pager" to indicate a paging device telephone number, "bbs" to indicate bulletin board system telephone number, "modem" to indicate a MODEM connected telephone number, "car" to indicate a carphone telephone number, "isdn" to indicate an ISDN service telephone number, "pcs" to indicate a personal communication services telephone number etc. The default type is usually "voice". These type parameter values can be specified as a parameter list (i.e., "TYPE=work;TYPE=voice") or as a value list (i.e., "TYPE=work,voice"). The default can be overridden to another set of values by specifying one or more alternate values. A type example may be TEL;TYPE=work,voice,pref,msg:+33-123-444-1234

A vCard contains further types concerned with information associated with geographical positions or regions associated with the object the vCard represents.

However, the current canonical representation of telephone numbers causes unnecessary costly problems, when for example a mobile phone tries to establish a connection with a person having given its telephone number via vCard. Depending on the location of the mobile phone, or portable computer etc, the system will always dial the canonically represented number even when the target person may be reached within a local area network, like a company network, a private network etc without dialling the entire canonically represented number.

SUMMARY OF THE INVENTION

Therefore, the problem underlying the present invention is to impart to a terminal (first system) to be used for a telecommunications between a near end user and a far end user a possibility to set up that telecommunications depending of its location within a defined area with respect to the location of the far end user. This problem is solved by a terminal comprising a processor, a memory unit and a display screen, the terminal to be used by a near end user for a telecommunications with a far end user. The telecommunications is activated by the near end user when selecting on the terminal information corresponding to that far end user. Those information includes a plurality of information value type whereby at least two out of the plurality of information value types have a different value type attribute, whereby each value type attribute is correlated with the location of the terminal within different possible areas with respect to the location of the far end user terminal (second system) while the combination of a value type and a value type attribute identifies the far end user, that combination being required to setup the telecommunications. The memory unit of the terminal contains instructions to be executed when such telecommunications towards a far end user is activated by the near end user, that instructions implementing a method of importing specific data from the selected information of that far end user, the method comprising the step of:

Locating the terminal of the near end user;

Associating that location of the terminal with one of the different possible areas identified by a specific value type attribute;

Extracting accordingly the specific data comprising that value type attribute out of the selected information from the far end user for setting up the activated telecommunications.

The terminal thus enables after being located to select the correct value type number correlated to its local position for establishing a telecommunications with the person (far end user) associated with the value type. The location can be determined by identifying the area within which it builds a connection prior to setup the activated telecommunications, that connection being available for the transmission of the telecommunications.

Usually but not exclusively, the different possible areas correspond to different existing networks like a second or third generation mobile phone technology based network (GSM, GPRS, UMTS), Worldwide Interoperability for Microwave Access WIMAX, some local area network (LAN) or different available wireless LAN WLANs among others.

In an embodiment, the terminal comprises a memory unit where pre-defined rules are stored. That rules are applied in the situation where the terminal builds a connection with more than one existing network. This is the case, when a geographical area is at least partly covered by different possible networks not necessarily of different types (e.g. two different WLANs) but each with a specific identification (e.g. for two WLANs through two different Service Set Identifiers) . Then, the rules are used for associating the terminal location of the near end user with respect to the location of the terminal of the far end user to a network according to some criteria like least cost routing or best quality of service.

In an advantageous embodiment, the terminal being possibly a computer system like a cellular (mobile) phone, a personal digital assistant or pocket-PC (PDA) comprises a radio interface to perform that connection via a wireless link to a base station being part of the network. That connection via the wireless link to the network with the base station is then used for setting up the activated telecommunications with the far end user.

In a further specific embodiment, the terminal performs an attempt to identify the network within its reach. Such attempt can be of a regularly basis (sniffing). And then, in the case of e.g. WLAN, the location of the near end user terminal is determined after reception by the terminal of that network identity being obtained as a specific Service Set Identifiers.

In a preferred embodiment, the terminal comprises a memory unit where the information of the far end user is stored in a pre-defined format possibly compliant with the vCard format. In the latter case, the property names and property parameters of the vCard are advantageously embedded as XML-code in a webpage. Thus, it is then universally applicable and enables transmission of the relevant data via different formats like e-mail, SMS etc. Therefore in another preferred embodiment, the retrieval on the terminal by the near end user of the far end user information is performed with some electronic mail message or an Internet web page (browser).

Preferably, the terminal comprises a memory unit for the storage of a directory with information of different far end users in the predefined format. The directory can be e.g. an electronic address book, an electronic calendar, an electronic phone number diary. The selection on the terminal by the near end user of the far end user information out of that directory can be performed using a browser available on that terminal.

That browser allows advantageously to retrieve further information in the pre-defined format by setting up a connection with a gateway, the gateway comprising a parser adapted to retrieved information originally in Lightweight Directory Access Protocol /LDAP/ to forward to the terminal the retrieved information in that predefined format embedded in a web page.

Advantageously, that combination of a value type and a value type attribute corresponds to a telephone number. In a further alternative, at least one combination corresponds to a telephone number expressed as a canonical representation of the phone number and at least one further combination corresponds to a telephone number expressed as a non-canonical representation.

Preferred fields of application require that the terminal of the far end user (second system) is a portable or pocket computer, a palm sized computer, a blackberry computer, a cellular (mobile) phone which shall connect to persons located in a plurality of interconnected computer systems, which consist of different subgroups (for examples LANs or WLANs etc) of computer systems.

Since small portable computer systems have a restricted computing ability, it is possible that a central system like a gateway provides after retrieval a plurality of value type attributes which represent for example telephone numbers for each number on the vCard.

A computer readable medium having a computer program recorded thereon, the computer program is running on a terminal after being activated by a near end user when selecting on the terminal information corresponding to a far end user for setting up a telecommunications using that terminal between the near end user and the far end user. The information includes a plurality of information value type whereby at least two out of the plurality of information value types have a different value type attribute, whereby each value type attribute is correlated with the location of the terminal within different possible areas with respect to the location of the far end user while the combination of a value type and a value type attribute identifies the far end user, that combination being required to setup the telecommunications. The computer program comprises codes adapted to perform the following steps:

Locating the terminal of the near end user;

Associating that location of the terminal with one of the different possible areas identified by a specific value type attribute;

Extracting accordingly the specific data comprising that value type attribute out of the selected information from the far end user for setting up the activated telecommunications.

DESCRIPTION OF THE DRAWINGS

The invention is described for illustrative purposes only without restricting the scope of the invention by way of examples and the figure in more detail.

FIG. 1 shows a schematic representation a mobile phone having stored vcard information upon establishing a connection to a person depending on the local position of the mobile phone.

DETAILED DESCRIPTION OF PREFERRED EMBODIMENTS

As explained before, a vCard is a collection of one or more properties. A property is a uniquely named value. A set of properties can be grouped within a vCard. For example, the properties for a telephone number and comment can be grouped in order to preserve the coupling of the annotation with the telephone number. In addition to property groupings, a vCard can include other, nested vcard objects. This allows for the recording of information about a secondary person or object associated with a given person or object. Additionally, this allows for the specification of a distribution list or work group of multiple vCard objects.

A vCard data stream may include one or more vCard objects. An individual vCard object is identified within a data stream by the appearance of the Begin vCard Delimiter:

BEGIN:VCARD

The sentinel string must appear as the first characters in the data stream or the first characters on a line.

The vCard object is terminated with either the logical end of the data stream or the appearance of the End vCard Delimiter as the first character on a line:

END:VCARD

A property is the definition of an individual attribute describing the vcard. A property takes the following form:

PropertyName [';' PropertyParameters] ':' PropertyValue as shown in the following example:

TEL;HOME:+33-3-77-99-77702

A property takes the form of one or more lines of text. The specification of property names and property parameters is case insensitive. The property name can be one of a set of pre-defined strings. The property name, along with an optional grouping label, must appear as the first characters on a line. In the previous example, "TEL" is the name of the Telephone Number property. Property values are specified as strings. In the previous example, "+33-3-77-99-77702" is the formatted value for the Telephone Number property represented in canonical form.

A property value can be further qualified with a property parameter expression. Property parameter expressions are delimited from the property name with a Semi-colon character (ASCII 59). A Semi-colon in a property parameter value must be escaped with a Backslash character (ASCII 92). The property parameter expressions are specified as either a name=value or a value string. The value string can be specified alone in those cases where the value is unambiguous.

A valid short version of the same property parameter specification might be:

NOTE;QUOTED-PRINTABLE:Don't remember to order a first class menu from Michel Guérard //Full property parameter expression There are two forms of grouping or collections supported within the vCard. A collection of vCard objects can be grouped and a collection of properties within an individual vCard can be grouped. This is also the case within the scope of the present invention, since the telephone numbers, represented in different forms (canonical and non-canonical) are also grouped within one collection of value type numbers or parameters, thus defining the "property grouping" of telephone numbers.

A Property Grouping is the definition of a method for specifying a collection of related properties within a vCard object. There is no requirement on a vcard reader that it preserve the property group name. However, the vcard reader is required to preserve the grouping of the properties.

The Property Grouping is identified by a character string prefix to the property name; separated by the Period character (ASCII decimal 46).

The grouping of a comment property with a telephone property is shown in the following example:

A.TEL;HOME:+33-3-77-99-77702
A.NOTE:This is my vacation home.

The vcard Reader conforming to this specification must be able to parse and process the property grouping. The support for Property Grouping is optional for a vCard Writer conforming to this specification.

It may also provide an encoding property at the transport wrapper level. This property can be used in these cases for transporting a vCard data stream that has been defined using a default encoding other than 7-bit (e.g., 8-bit).

The usual telephone number property specifies the canonical number string for a telephone number for telephony communication with the vCard object. The value of this property is specified in a canonical form in order to specify an unambiguous representation of the globally unique telephony endpoint. This property is based on the X.520 Telephone Number attribute.

The canonical form cannot be dialed without first being transformed by a dialing algorithm. The dialing algorithm combines the canonical number string with knowledge of the local dialing procedures, in effect at the time of call placement to produce actual dialing instructions. The actual dialing algorithm is outside the scope of this specification.

Software which creates this property can store a string in these allowed formats. Dialing software should be prepared to parse numbers from either of the supported formats; as neither format is considered to be technically costly to support.

This property is identified by the property name TEL. An example of this property follows:

TEL;PREF;WORK;MSG;FAX:+1-800-555-1234

Support for this property is optional for vCard Writers conforming to this specification. The Telephone Type property parameter specifies the sub-type of telephone that is associated with the telephone number (e.g., Home, Work, Cellular, Facsimile, Video, Modem, Message Service, or Preferred). One or more sub-type values can be specified for a given telephone number.

As an example to better illustrate the present invention without unduly limiting its scope, a person can therefore be identified by the 3 following business telephone numbers which are indicated on its corresponding vCard:

+33 3 90 67 77 02
7 77 02
1234 7702

The first one is the canonical representation used in prior art as explained in the foregoing. It is used in conjunction with the international dialing plan. It is the one that is offered in particular with GSM phones. The second one is a representation in non-canonical form and has to be chosen (dialed) by the near end user when requiring a telecommunications with the far end user identified by that vcard in the case when both the terminal of the near end user as well as the terminal of the far end user according to the invention are logged on for example in a "private home database" network. The third one also represented in non-canonical form is to be used when both the near and far end user terminal are for example logged on a "private visitor database" network. The vCard according to the invention thus offers different fields for indicating telephone numbers of a person to be contacted (far end user), the telephone numbers being represented in canonical and non-canonical form. This allows a near end user desiring to establish a telecommunication with the far end user to set up that telecommunications in an optimal way by selecting the suitable number to be dialed depending on the location of its terminal at each moment with respect to the location of the far end user. In the special case that several way could be chosen, then the optimization may consist by choosing the way according to some predefined rules preferably stored on the near end user terminal. The rules apply some criteria like least cost routing or best quality of service according to which an optimized way is chosen for setting up the telecommunications.

All vCards according to the invention can also have graphics and multimedia including photographs, company logos, audio clips such as for name pronunciation Geographic and time zone information in vCards let others know when to contact the user. The vCard spec is transport and operating system independent so vcard-ready software can be installed on any computer or mobile phone. vCards according to the invention are Internet friendly, standards based, and have wide industry support. VCards according to the invention can be used over infrared links between hand-held organizers, PDAs (Personal Digital Assistants), and notebook PC's from any manufacturer. Within seconds, the participants have the information automatically stored in their favorite directory. Later it can be used to place a phone call, send a fax or Email, or even to initiate a video conference. There is no need to manually enter business card information.

When using a notebook PC with a DSVD (Digital Simultaneous Voice and Data) modem to browse product highlights on a company's homepage. For a call center, this can very significantly cut down the call time by eliminating the time (and errors) it takes to exchange this information verbally with an operator at a computer keyboard. This provides a great productivity and cost savings in the call center environment.

Voice response units can provide an option to "press 2 to leave your vcard". Software telephony applications can implement a Send vCard button. This would also provide enhanced functionality for a mobile phone.

Other applications include office products, pager applications and smart card technology.

FIG. 1 illustrates in a schematic representation how to use a terminal according to the invention. Such a terminal 103 of a user (near end user) preferably a mobile terminal comprises a processor, a memory unit and a display screen and is able to establish connections by different ways, for example by different telecommunication standards as the GSM standard etc. In the memory unit is stored at least a vCard of a far end user to whom a telecommunications has to be set up. Such vCard can be in some directory and selected by the near end user using some browser. The mobile terminal may be any mobile terminal able to establish a connection by a telephone net, like a portable computer (laptop), a mobile phone, a PDA, a Blackberry computer etc. and is not restricted thereto.

The 3 following business numbers are indicated on selected vCard for a person (far end user) to be called by the terminal 103:

+33 3 90 67 77 02

7 77 02

1234 7702

The first one is the canonical representation, represented in FIG. 1 as 111 used in prior art, which is used in conjunction with the international dialing plan. This is the one that is offered in particular with GSM phones when trying to reach the person from anywhere outside.

The second one has to be dialed when the terminal 103 according to invention is logged on for example a "private home database" network. This is represented by 101, the local onnet (LAN), for example connecting a site in Paris 105 with a site in Neuilly 106, each site with local onnet phone numbers 108 and 109.

The third one 1234 7702 is to be used by the terminal 103 when for example logged on a "private visitor database" network, for example a remote onnet 102 (WLAN) connecting different sites in a multinational company, for example, one site being located in Berlin 107, 110, others in Paris 105 and Neuilly 106. Each site has its own access points 104 building a network with a specific identity name (SSID) while being interconnected through some intranet or Private Branch Exchange or even the internet. After the terminal 103 receives the network identity and if it does not correspond to the network where the far end user is located but the same onnet 102 then the terminal 103 establishes the telecommunication to that far end user by dialing that third phone number, the different networks.

Definitions and Abbreviations vCard:

A standard defining the format of an electronic business card. All devices supporting vCard can exchange information such as phone numbers and addresses. For instance a user with a vCard-aware phonebook application on a handheld computer can easily transfer names and phone numbers to a vCard-aware mobile phone.

Copyrights

The format is suitable as an interchange format between applications or systems. The format is defined independent of the particular method used to transport it. The transport for this exchange might be a file system, point-to-point asynchronous communication, wired-network transport, or some form of unwired transport.

A vCard is a data stream consisting of one or more vCard objects. The individual vCard definitions can be identified and parsed within the datastream. The vcard data stream may exist as a persistent form in a file system, document management system, network connection between two network endpoints, or in any other digital transport that has an abstraction of a stream of bytes.

Conceptually, a vCard Writer creates vCard data streams and a vCard Reader interprets vCard data streams. The vCard Reader and Writer may be implemented as a single application or as separate applications. It is not the intent of this specification to define the implementation of these processes beyond some fundamental capabilities related to the format of the vCard data stream and a common set of conformance requirements This specification provides for a clear-text encoding that is intended to be based on the syntax used by the MIME specification (RFC 1521).

The encoding of this specification can be used in environments which are constrained to 7-bit transfer encodings, short line lengths, and low bandwidth. In addition, the encoding is simple in order to facilitate the implementation of reader and writer applications on small platforms, such as Personal Digital Assistants (PDA), cellular telephones, or alphanumeric pagers.

The vCard is intended to be used for exchanging information about people and resources. In today's business environment, this information is typically exchanged on business cards. It is appropriate, then that this specification define this information in terms of a paradigm based on an electronic business card object.

The ultimate destination for this information is often a collection of business cards or electronic contact manager.

The basis for the data types supported by this specification have their origin in openly defined, international standards and in additional capabilities based on enhancements suggested by the demonstration of the exchange of prototypical vCards using the Internet based World-Wide-Web, Infra-red data transport, and simultaneous voice and data (SVD) modems.

The "person" object defined by the CCITT X.500 Series Recommendation for Directory Services was the primary reference for the properties that are defined by this specification. The X.520/X.521 attributes and objects are mapped into and out of an instance of a vcard. The vcard specification has extended the capabilities that have been defined within the CCITT X.500 Series Recommendation to allow the exchange of additional information often recorded on business cards and electronic contact managers.

The specification of all date and time values are defined in terms of the ISO 8601 standard for representation of dates and times.

The paradigm of an electronic business card is related to the concepts of an entry in a LAN/WAN directory or an electronic mail address book or distribution list. The vCard specification is needed to address the requirements for an interchange format for the "person" personal data type or object.

Personal data applications such as Personal Information Managers (PIM) often provide an import/export capability using Comma Separated Value (CSV) or Tab Delimited Files (TDF) formats. However, these solutions do not preserve the intent of the originating application. When a CSV and TDF format is used by a PIM, the meta-data or semantics of the originating object are only apparent to a similar version of the originating application. Exchange of data between such applications is another important application of an industry-standard specification for an electronic business card interchange format, such as the vcard specification.

FPI: Formal Public Identifier. A string expression that represents a public identifier for an object. FPI syntax is defined by ISO 9070.

GUID: Globally Unique Identifier

Internet: A WAN connecting thousands of disparate networks in industry, education, government, and research. The Internet uses TCP/IP as the standard for transmitting information.

MIME: Multipurpose Internet Mail Extensions, as defined in RFC1521.

PDA: Personal Digital Assistant computing device

PDI: Personal Data Interchange, a collaborative application area which involves the communication of data between people who have a business or personal relationship, but do not necessarily share a common computing infrastructure.

PIM: Personal Information Manager

RFC#### documents: Internet "Request For Comment" documents (i.e., RFC822, RFC1521, etc.).

URL: Uniform Resource Locator; a string expression that can represent any resource on the Internet or local system. RFC 1738 defines the syntax for an URL.

UTC: Universal Time Coordinated; also known as UCT, for Universal Coordinated Time.

WAN: Wide-Area Network

The invention claimed is:

1. A terminal comprising a processor, a memory unit and a display screen, the terminal to be used by a near end user for a telecommunications with a far end user, the telecommunications being activated by the near end user when selecting on the terminal information corresponding to the far end user, the information including a plurality of information value types whereby at least two out of the plurality of information value types have a different value type attribute, whereby each value type attribute is correlated with the location of the terminal within different possible areas with respect to the location of the far end user while a combination of a value type and a value type attribute identifies the far end user, the combination being required to setup the telecommunications, wherein the memory unit contains instructions to be executed when such telecommunications towards a far end user is activated by the near end user, the instructions implementing a method of importing specific data from the selected information of the far end user, the method comprising:

locating the terminal of the near end user;

associating the location of the terminal of the near end user with one of the different possible areas identified by a specific value type attribute; and extracting accordingly the specific data comprising the specific value type attribute out of the selected information from the far end user for setting up the activated telecommunications;

wherein the terminal comprises a memory unit for the storage of a directory with information of different far end users in the predefined format, the selection on the terminal by the near end user of the far end user information out of the directory being performed using a browser available on the terminal, the browser allowing retrieval of further information in the predefined format by setting up a connection with a gateway, the gateway comprising a parser adapted to retrieve information originally in Lightweight Directory Access Protocol (LDAP) to forward to the terminal the retrieved information in the predefined format embedded in a web page.

2. The terminal according to claim 1, wherein the terminal location is determined by identifying the area within which the terminal builds a connection prior to setup of the activated telecommunications, the connection being available for the transmission of the telecommunications.

3. The terminal according to claim 2 wherein a plurality of areas correspond to a plurality of existing networks.

4. The terminal according to claim 3, wherein the terminal comprises a memory unit in which predefined rules are stored to be applied for associating the terminal location to one network when the terminal builds a connection with a different existing network.

5. The terminal according to claim 3, wherein the terminal comprises a radio interface to perform the connection via a wireless link to a base station being part of the network to be used for setting up the activated telecommunications with the far end user.

6. The terminal according to claim 5, wherein the terminal performs an attempt to identify the network within its reach, the location of the near end user terminal being determined after reception by the terminal of the network identity.

7. The terminal according to claim 1, wherein the terminal comprises a memory unit where the information of the far end user is stored in a predefined format while the property names and property parameters of the predefined format are embedded as XML-code in a webpage.

8. The terminal according to claim 1, wherein the combination of a value type and a value type attribute corresponds to a telephone number.

9. The terminal according to claim 8, wherein at least one combination corresponds to a telephone number expressed as a canonical representation of the phone number and at least one further combination corresponds to a telephone number expressed as a non-canonical representation.

10. A computer readable medium, embodied on a processor, having a computer program recorded thereon, the computer program being executable on a near end terminal after being activated by a near end user when selecting on the near end terminal information corresponding to a far end user for setting up a telecommunications using the near end terminal between the near end user and the far end user, the information including a plurality of information value types whereby at least two out of the plurality of information value types have a different value type attribute, whereby each value type attribute is correlated with the location of the terminal within different possible areas with respect to the location of the far end user while the combination of a value type and a value type attribute identifies the far end user, the combination being required to setup the telecommunications, the computer program comprising codes adapted to perform the following steps:
  locating the near end terminal of the near end user;
  associating the location of the near end terminal with one of the different possible areas identified by a specific value type attribute; and
  extracting accordingly the specific data comprising the specific value type attribute out of the selected information from the far end user for setting up the activated telecommunications,
wherein the terminal comprises a memory unit for the storage of a directory with information of different far end users in the predefined format, the selection on the terminal by the near end user of the far end user information out of the directory being performed using a browser available on the terminal, the browser allowing retrieval of further information in the predefined format by setting up a connection with a gateway, the gateway comprising a parser adapted to retrieve information originally in Lightweight Directory Access Protocol (LDAP) to forward to the terminal the retrieved information in the predefined format embedded in a web page.

* * * * *